(12) United States Patent
Parker et al.

(10) Patent No.: US 7,644,425 B2
(45) Date of Patent: Jan. 5, 2010

(54) PICTURE-IN-PICTURE MOSAIC

(75) Inventors: Alistair John Parker, Quispamsis (CA); Jeff Furlong, Grand Bay-Westfield (CA); Gino Louis Dion, McKinney, TX (US); Sean Gordon Higgins, Saint John (CA); David Cecil Robinson, Aldbrourne (GB)

(73) Assignee: Alcatel Lucent, Paris (FR)

( * ) Notice: Subject to any disclaimer, the term of this patent is extended or adjusted under 35 U.S.C. 154(b) by 623 days.

(21) Appl. No.: 11/385,735

(22) Filed: Mar. 22, 2006

(65) Prior Publication Data

US 2007/0250896 A1   Oct. 25, 2007

(51) Int. Cl.
*G06F 13/00* (2006.01)
*G06F 3/00* (2006.01)
*H04N 5/445* (2006.01)

(52) U.S. Cl. .............................. 725/41; 725/43; 725/52; 725/56; 725/61; 348/563

(58) Field of Classification Search ............. 725/37–41; 348/563
See application file for complete search history.

(56) References Cited

U.S. PATENT DOCUMENTS

2003/0161395 A1* 8/2003 Byers ..................... 375/240.01
2004/0060061 A1* 3/2004 Parker ......................... 725/38
2005/0280742 A1* 12/2005 Jaffe .......................... 348/726

FOREIGN PATENT DOCUMENTS

EP        1453317        9/2003

* cited by examiner

*Primary Examiner*—Hunter B. Lonsberry
(74) *Attorney, Agent, or Firm*—Kramer & Amado, P.C.

(57) ABSTRACT

The PIP system enables display of a mosaic of favorite channels in a Picture-in-Picture (PIP) format to a subscriber terminal. Picture-in-Picture support is efficiently provided by sending only I-Frames of the secondary video channel to the end-user. That is, any unnecessary packets (null, B-P frames, audio, etc.) in the secondary video channel are stripped away. This method uses very little bandwidth and is STB agnostic.

24 Claims, 4 Drawing Sheets

PICTURE-IN-PICTURE MOSAIC

FIELD OF THE INVENTION

The invention is directed to communication networks and in particular to methods and apparatus for implementing a picture-in-picture (PIP) mosaic.

BACKGROUND OF THE INVENTION

The use of digital signals for television broadcasts and the transmission of other types of video and audio signals allow a significant improvement in picture quality and a more efficient use of bandwidth over that currently possible using analog television signals. The Advanced Television Systems Committee (ATSC) is a standards organization that was created to promote the establishment of technical standards for all aspects of advanced television systems. The ATSC adopted 8-VSB (vestigial sideband) standard radio frequency modulation format for the broadcast of digital TV signals, because of its large bandwidth, which is needed to transmit HDTV programming. With this carrier modulation type, the modulating data appears in the form of signal components at frequencies slightly higher and lower than that of the carrier; these components are called sidebands. As the lower sideband (LSB) and the upper sideband (USB) are essentially mirror images of each other, one can be discarded or used for a second channel (also referred to as a secondary channel), or for diagnostic purposes.

In recent years, the customer premise equipment has evolved to enable the user with additional services that become more sophisticated as new features are envisaged. Currently, users of multimedia entertainment content can interact with the server that provides the content using a device generally called a "set-top box" (STB). Among the most useful and important features of modern STBs are channel browsing or surfing, visual bookmark capability, the capability of simultaneous viewing of more than one channel, etc.; new features emerge based on user demands. While some viewers may use a program guide for this purpose, others may wish to see what programs are currently playing as opposed to reading about these only. Still further, some users may wish to view two or more programs simultaneously.

All of these features can be provided by showing reduced-size versions of the channels content concurrently in one or more small areas of a display screen. This capability is known as picture-in-picture (PIP). For example, a reduced-size image of a program playing on another channel may be displayed on the user's screen as a part of a video browsing function, while the currently selected content continues playing.

Various technologies are available for "summarizing" or "previewing" different types of media content. For example, technology is available for removing pauses from spoken audio content. Audio content can also be summarized with algorithms that detect "important" parts of the content as identified by pitch emphasis. Similar schemes can be used with other types of media streams, such as video streams, animation streams and script streams. For example, the MPEG (Moving Picture Experts Group) standard defines how the video data should be encoded (summarized), decoded and streamed to the clients for playback.

Picture in Picture is a common staple in video, frequently used in TV news shows, and is also applicable to most security systems that need to visually survey a plurality of points of interest. Picture in Picture can also be used on a player for the purposes of watching a recording while using the secondary frame to show the viewer what other desired broadcast programming is on.

PIP allows one to watch more than one TV program (channel) at the same time on television sets or other devices. With PIP feature, one program will be displayed on the entire TV screen, and another program or programs will be displayed in individual smaller squares on the screen. Picture in Picture requires today two independent tuners one supplying the large picture and the other, the small picture. Single tuner PIP TVs require the use of the DVD/VCR tuner to act as the second tuner, while two-tuner PIP TVs have a second tuner built in for this purpose. Some users find that using the DVD/VCR as the second tuner can be difficult to hook-up and confusing to use.

Picture-in-picture images can be created using one or more passes, and the smaller image can be placed anywhere in the frame, presented in the original shape or as a circle, and have hard or soft edges.

It is also desirable to have multiple reduced-size images (thumbnail images) shown concomitantly on the screen. These reduced size images may be derived from stored video streams (e.g., stored in memory or on a disk drive), video streams being recorded or obtained "on-the-fly" in real time from a video stream being displayed.

However, due to the high computational overhead associated with the derivation of reduced-size images, dedicated decoding hardware is also employed for these features, often requiring completely separate decoding hardware for the reduced-size image production. As a result, the current systems either require complex video multiplexing or transcoding systems to process client requests for picture-in-picture views, or require the client to receive and decode two or more full video streams to preview additional channels. Hence, in the case of the former solution, they are too costly, and in the case of the latter solution, they are too resource intensive within the client-side equipment.

There is a need for viewing multiple channels at once. Not only would such a solution alleviate the aggravation of the channel surfing, it would also allow the channel surfers to minimize their practice. Ideally, such a solution should require minimal changes to the existing digital multimedia systems equipment. Also, such a solution should be usable on most, if not all existing digital multimedia systems.

Therefore there is also a need to provide a cost-effective and resource efficient technique to provide advanced picture-in-picture support. For example, there is a need for a method and apparatus able to implement picture-in-picture capability in a digital multimedia system, without incurring the cost of multiple full resolution decoders.

SUMMARY OF THE INVENTION

It is therefore an object of the present invention to at least mitigate, if not overcome, the disadvantages of the prior art.

It is another object of the invention to provide a cost-effective and resource efficient method to provide advanced picture-in-picture support.

Accordingly, the invention provides a method for producing thumbnail images of video content in a video stream carrying frames of compressed video data, comprising: a) storing in an input buffer a preset amount of the video data from the video stream; b) selecting from the input buffer a specified number of frames identified by a significant change in the video data for generating a preview signal; c) converting the preview signal into a picture-in-picture (PIP) stream and broadcasting the PIP stream to subscriber terminals (ST)

over an access network according to a transmission protocol recognized by the network; and d) at a ST, joining a PIP stream of interest for playback of a thumbnail moving image with the video content in the video stream, overlaid on a full size image of the video content in any video stream that is currently played-back on the ST, wherein the PIP stream uses a portion of network bandwidth otherwise needed if all frames of the video streams were broadcast over the access network.

The invention is also directed to a server for producing thumbnail images of video content in video streams carrying frames of compressed video data, comprising: n input buffers, each for storing a preset amount of the video data from a respective video stream, under control of a controller; m preprocessing units, each associated to an input buffer for extracting from the associated input buffer a specified number of frames identified by a significant change in the video data, and generating from the specified number of frames an individual preview signal, where m and n are integers and m≦n; a network interface for converting each individual preview signal into a picture-in-picture (PIP) stream and broadcasting the PIP streams to subscriber terminals (ST) over an access network, wherein each PIP stream uses a portion of bandwidth otherwise needed if all frames of the video stream were broadcast to the ST.

According to a further aspect, the invention is directed to a picture-in-picture (PIP) receiving unit for enabling a subscriber terminal (ST) to join a PIP streams for playback of a thumbnail moving image of video content in a corresponding video stream, overlaid on a full size image of the video content in any video stream that is currently played-back on the ST, comprising: a network interface for interaction with a PIP server over an access network for requesting, receiving and demodulating a reduced bandwidth PIP stream into a preview signal including a specified number of frames of video data selected from a video stream carrying frames of compressed video data; a user interface for enabling a user of the ST to request the PIP stream from the PIP server; and a PIP decoder for converting the preview signal into a video signal for enabling playback of a thumbnail moving image of the video content in the video stream at the ST.

Advantageously, the method of the invention provides a cost-effective and resource-efficient technique to provide advanced picture-in-picture support with no need for expensive back-end multiplexing engine or for multiple tuners at the provider or user site.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENTS

The invention is described next in connection with the MPEG2 trans[AJP1]port streams which are popular today;
however, the invention is not restricted to MPEG technology. A brief description of a MPEG video stream is provided next for enabling an explanation of how the invention works by way of example. The MPEG-2 video compression standard achieves high data compression ratios by producing information for a full frame video image only every so often, and getting rid of the redundant information which would normally be in every single frame of video. Thus, an MPEG encoder actively selects frames to be used as I-Frames; the qualification as an I-Frame (Intra-Frame) is that there needs to be a "significant change" from the frame before it (like an explosion, or a new character in a scene, etc). If changes are minimal, an I-Frame is transmitted every N frames in the video stream where N is typically 12 or 15.

The intervening frames between the I-Frames are obtained by using various techniques. A P-frame (or predicted frame), which is transmitted every $4^{th}$ frame typically, is obtained by changing only the macro blocks from the last I-Frame that are very different from the frame before; the P-frame is overlayed onto the original I-Frame. The B-frames (bidirectional frames) fill the "space" between I and P frames for smoothing the transitions. Delta-coding, motion compensation, and interpolative/predictive techniques are used to produce these intervening frames.

According to the invention, Picture-In-Picture support is efficiently provided by sending to the requesting end-users only selected I-Frames of the secondary video channel, whereas the primary video channel sends the entire information. That is, B-frames, P-frames, audio, etc. in the video channel are stripped away, so that the stream carrying the reduced size picture uses very little bandwidth, and is subscriber terminal agnostic. The bandwidth required can be further managed by configuring the update rate of the I-Frame stream—some I-Frames can be skipped to reduce bandwidth.

Figure 1:
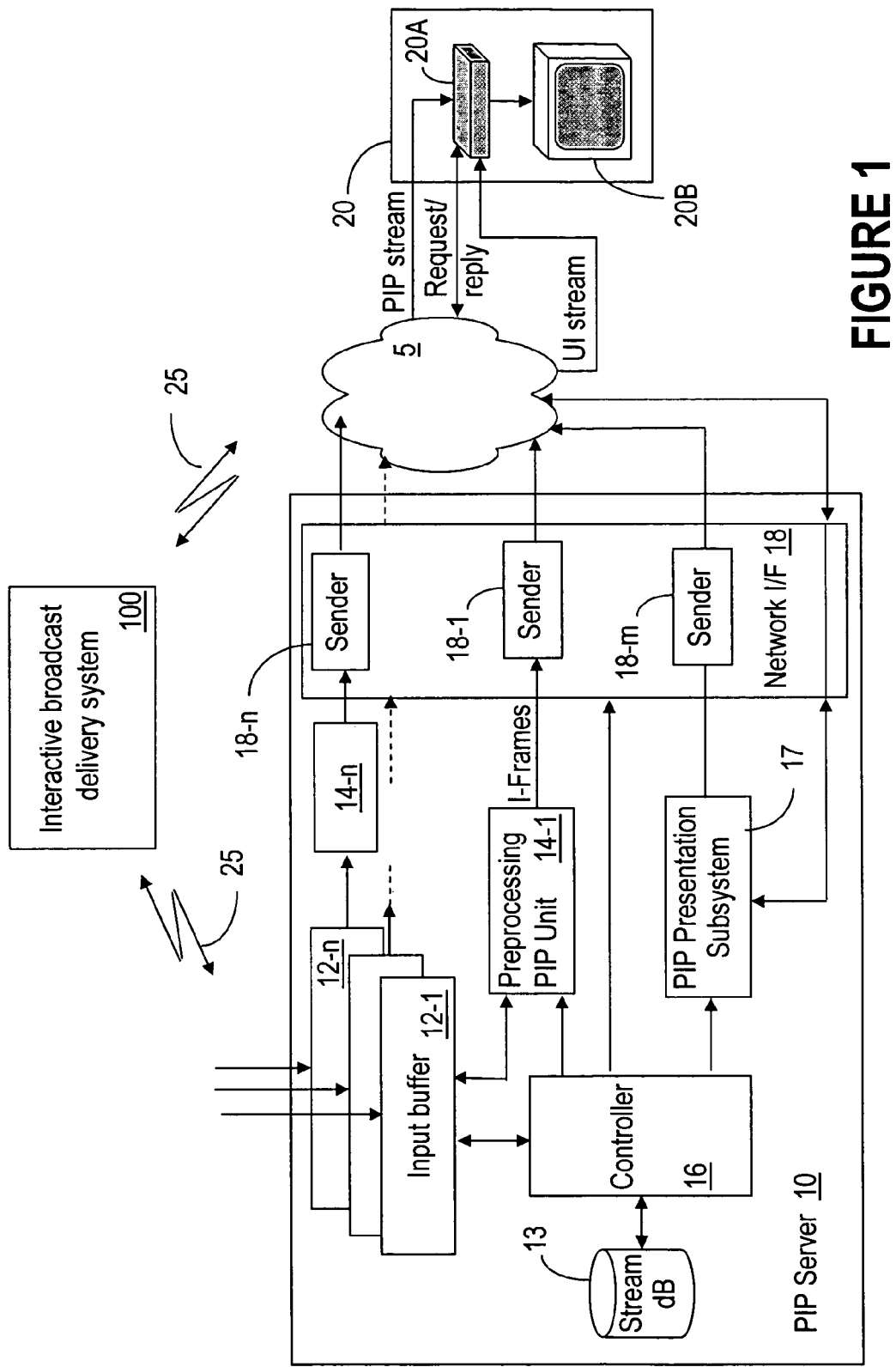
FIG. 1 illustrates a block diagram of the PIP system according to an embodiment of the invention.

FIG. 1 shows a block diagram of the picture-in-picture system according to an embodiment of the invention. A PIP server 10 provides PIP service to a plurality of subscriber terminals (ST) 20 over a network 5. Only one subscriber terminal is illustrated for simplicity although server 10 could provide support for hundreds of clients. The term "subscriber terminal (ST)" is used here to designate generically the end-user equipment that enables decoding of multimedia (audio, video, data) streams and playing-back (rendering) the information carried by these streams; the ST may be e.g. a PC, or a laptop, notebook, or may include a TV set 20B and a set-top box 20A as shown in the example of FIG. 1.

FIG. 1 also shows an interactive broadcast delivery system 100 provided at the edge of a broadband communication network for enabling a ST 20 to select and receive multimedia information of choice. When delivery system 100 uses MPEG, it broadcasts MPEG2 transport streams 25; a transport stream includes one or more video and audio packetized elementary streams (PES), each PES including an independent timebase for clock recovery and audio/video synchronization information. The transport stream also includes program and system information (PSI), which describes the elementary streams which need to be combined to build programs. Conditional access information in each stream enables selective access to the programs and to data services which may be associated with the programs. The PSI includes data that the STs use in order to determine which programs exist in the respective transport stream, and to identify the video, audio, and data content of a respective program carried by the stream. A ST 20 can join any of the transport streams broadcast by delivery system 100 and can select a particular program based on the program information in the stream and also according to the content subscribed for.

PIP server 10 could be a standalone server, as shown in FIG. 1, in which case it joins transport streams 25 of interest to its clients (STs 20). PIP server 10 may also be co-located with the delivery system 100, in which case it has access to the multimedia data directly.

Server 10 is provided with a plurality of input buffers 12-1 to 12-*n*, each associated with a PIP preprocessing unit 14-1 to 14-*m* respectively. Each buffer stores a certain amount of data received from an elementary video stream of each respective transport stream as it arrives from broadcast delivery system 100, for enabling pre-processing of the streams. Each PIP preprocessing unit 14-1 to 14-*m* accesses a corresponding input buffer 12-1 to 12-*n* and selects from the buffer content only the I-Frames, while disregarding the B, P and other frames. A plurality of I-Frame streams, each containing only the I-Frames selected from the complete information carried by the respective elementary stream, are available at the output of the respective preprocessing units 14-1 to 14-*m*. An individual, reduced bandwidth video signal comprising only the I-Frames of a given channel is referred to here as "individual preview signal"

It is to be noted that FIG. 1 shows that each input buffer 12-1 to 12-*n* is associated with a preprocessing unit 14-1 to 14-*m* by way of example. In principle, the number of input buffers to 12-1 to 12-*n* depends on the number of transport streams the server is adapted to receive, while the number of preprocessing units 14-1 to 14-*m* depends on the number of channels packed into these transport streams. Thus, an input buffer may buffer more than one channel, in which case more than one preprocessing unit is associated with that input buffer. [AJP2] Or, a preprocessing unit may process simultaneously I-Frames from more than one elementary stream, from one or more input buffers. In this case, the preprocessing unit separates the I-Frames into the respective individual preview signals. Allocation of preprocessing units 14-1 to 14-*m* to buffers 12-1 to 12-*n* is performed by a control unit 16.

PIP server 10 also includes a network interface 18 for processing the individual preview signal before sending them to subscribers over network 5. Here, each individual preview signal is encoded by a sender 18-1 to 18-*n* of into a respective individual PIP stream (also referred to as preview streams) which is broadcast over network 5 to terminals 20. The type of senders 18-1 to 18-*n* depends on the type of network 5 (e.g. wireless, cable, Internet-based). Widely available types of senders may be used for this purpose. Preferably, according to the invention, a sender transmits a respective PIP stream over the secondary channel, when 8-VSB transmission standard is used [AJP3]. It is evident that the bandwidth used by the PIP streams is much smaller that the bandwidth otherwise necessary is all frames in the stream where used instead of just I-Frames.

The individual preview signal can then be viewed in a small secondary viewport at the ST 20[AJP4]. A ST 20[AJP5] can join any of the individual preview streams and then select to view the content shown by the thumbnail image, or not.

Also shown in FIG. 1 is a PIP presentation subsystem 17, which provides a user interface (UI) to the preview video signal. The UI may be an HTML (Hypertext Markup Language) frame which presents channel identification information, for example a tag, to the thumbnail video image in the preview signal. Also, the UI video signal may carry presentation data such as to present a suitable background and/or a frame around the thumbnail image. PIP presentation subsystem 17 is aware of which channel each thumbnail image represents using data provided by controller 16, which has access to stream information. The stream information may, for example, be pre-stored in a database 13 which maintains programs, channels, and time slots for the programs information. Program and system information in database 13 may be updated by an operator (not shown) or automatically by accessing the respective information in the buffers [AJP6]. As such, controller 16 may provide to subscribers a different (selected or pre-selected) design of the channel information on the thumbnail image carried by the PIP stream.

In the embodiment of FIG. 1, the HTML UI could be delivered through network 5 using a sender, for example a dedicated sender 18-*m* of the interface 18. The UI stream is then received by a browser at the ST 20 upon request through a separate interaction. [AJP7]Alternatively, subsystem 17 may also use the sender allocated to the respective channel for which the preview is processed. The subscriber terminal 20A joins the PIP and the UI streams and combines the PIP data with the UI data to provide a PIP image on the display 20B. In this way, a suitable caption overlays the respective thumbnail image on the subscriber screen 20B.

Figure [AJP8] 2 shows another embodiment of the invention, where a PIP server 30 enables a subscriber to view a mosaic of thumbnail images on screen 20B, representing preview images for a plurality of channels, for enabling the subscriber to select one of the channels. This embodiment uses a video multiplexer 15 that aggregates the individual preview signals into a composite video signal representative of video content provided by the channels. The composite video signal is referred to here as the "composite preview signal" or "preview mosaic". In the case of an MPEG2 transport stream, the format of the I-Frames is based on coefficients derived from a 2-dimensional discrete cosine transform applied to 8×8 blocks of pixels or pels (a format quite similar to the format used in a static JPG picture). The computationally intensive work is required up front in the MPEG2 encoder to initially generate the coefficients. The actions of scaling, transposing or rendering the transform is less intensive and therefore this format can be readily scaled and transformed to compose the preview mosaic in multiplexer 15.

The video multiplexer 15 may be a commercially available or purpose-built software video multiplexer which can receive multiple video signals and output a composite video signal composed of one ore more input video signals. Video multiplexers such as those used in the surveillance camera industry or in the video security industry may be suitable for this purpose. Preferably, the video multiplexer 15 is able to multiplex and output substantially full motion color video signals. Controller 16 controls the video multiplexer 15 for instructing which channels should be included in the composite video signal, and configures the preprocessing units 14 accordingly.

In this embodiment, the composite preview signal carrying the individual preview signals is then encoded by a sender 18' at the network interface 18 and broadcast to end user devices 20 under control of unit 16. As in the embodiment of FIG. 1, the type of sender 18 depends on the type of network 5 (e.g. wireless, cable, Internet-based). Preferably, according to the invention, sender 18 transmits the composite preview signal (or PIP mosaic stream) over the secondary channel, when 8-VSB transmission standard is used.

Figure 2:
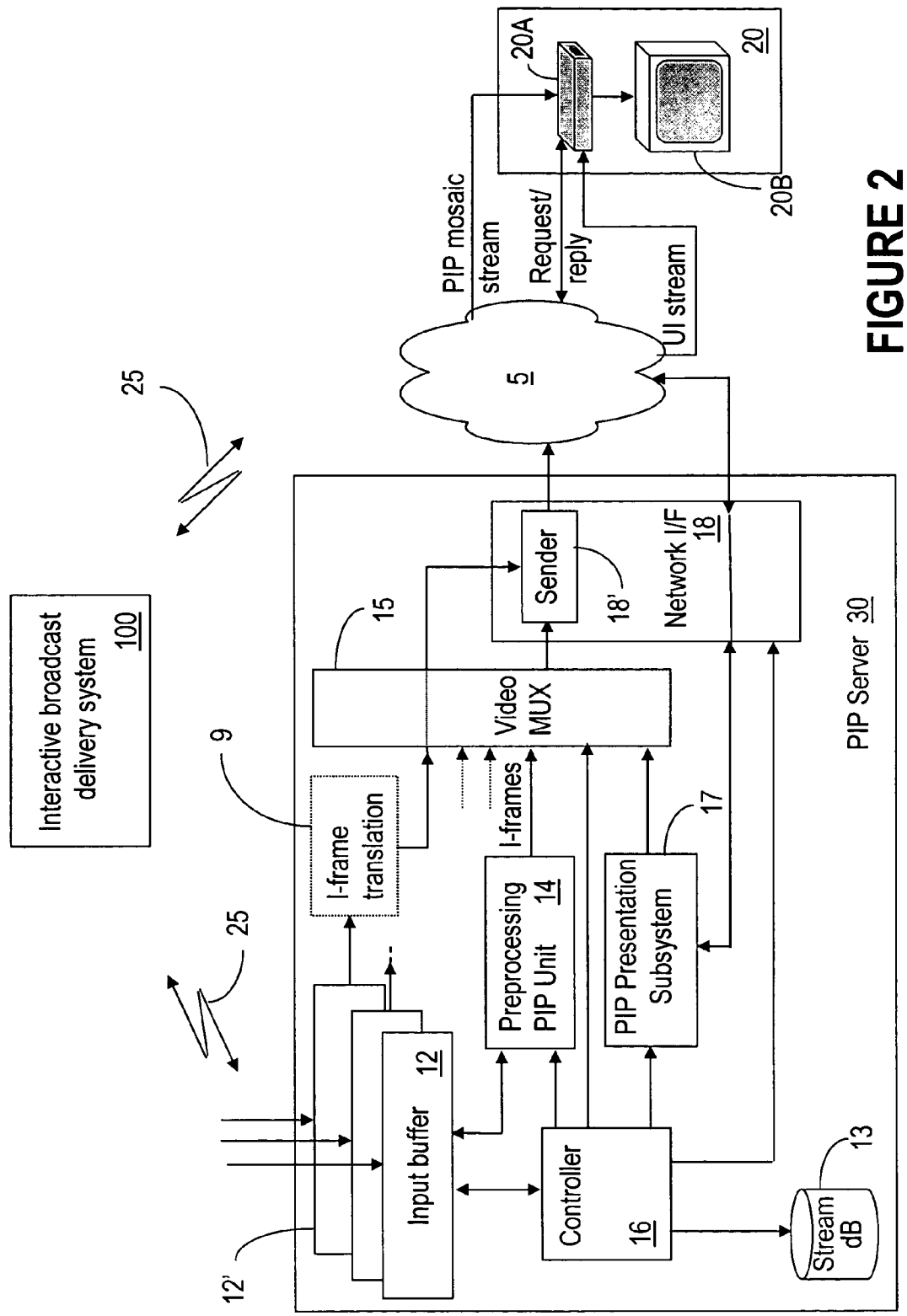
FIG. 2 illustrates a block diagram of the PIP system according to another embodiment of the invention.

PIP server 30 of FIG. 2 also uses a PIP presentation subsystem 17, which provides the user interface (UI) to the composite video signal. The UI may again be an HTML frame which presents channel identification information to each thumbnail video image in the preview mosaic. Also, the UI video signal may present a suitable background and/or a frame around each thumbnail image of the mosaic. PIP presentation subsystem 17 is aware of which channel each thumbnail image represents using data provided by controller 16, using as before, information from database 13. Once this information is available, the subsystem 17 overlays a suitable caption underneath the relevant thumbnail image in the preview mosaic. As such, controller 16 may dictate a different layout for the arrangement of the thumbnails images into the composite signal, or may provide a different design of the channel information.

As for the embodiment of FIG. 1, the HTML UI is delivered through network 5 to a browser at the ST 20 upon request through a separate interaction. [AJP13] In this case the subscriber terminal 20A joins the PIP and the UI streams and combines the PIP data with the UI data to provide a PIP image on the display 20B. In this example, all users have access to the same preview mosaic.

A simple mosaic overlay of the previewed channels can be presented to the client, for his/her favorite channels, thereby linking Picture-in-Picture to a user's "favorite" channels for quick preview access. An embodiment for accomplishing this functionality is shown in FIG. 3.

In this alternative embodiment, a PIP server 40 maintains in database 13 a plurality of variants of channel groupings, based e.g. on the viewing profile of its subscribers. Database 13 can be populated off-line at regular interval as the number of clients and their profiles change. The channel groupings in database 13 may also be generated/updated based on statistics collected by the interactive broadcast delivery system 100. In this case, the mosaic information may be received by server 40 at regular intervals from delivery system 100, or if the servers 100 and 40 are collocated, it can be received from a respective statistics keeping unit available at server 100 (not shown).

Figure 3:
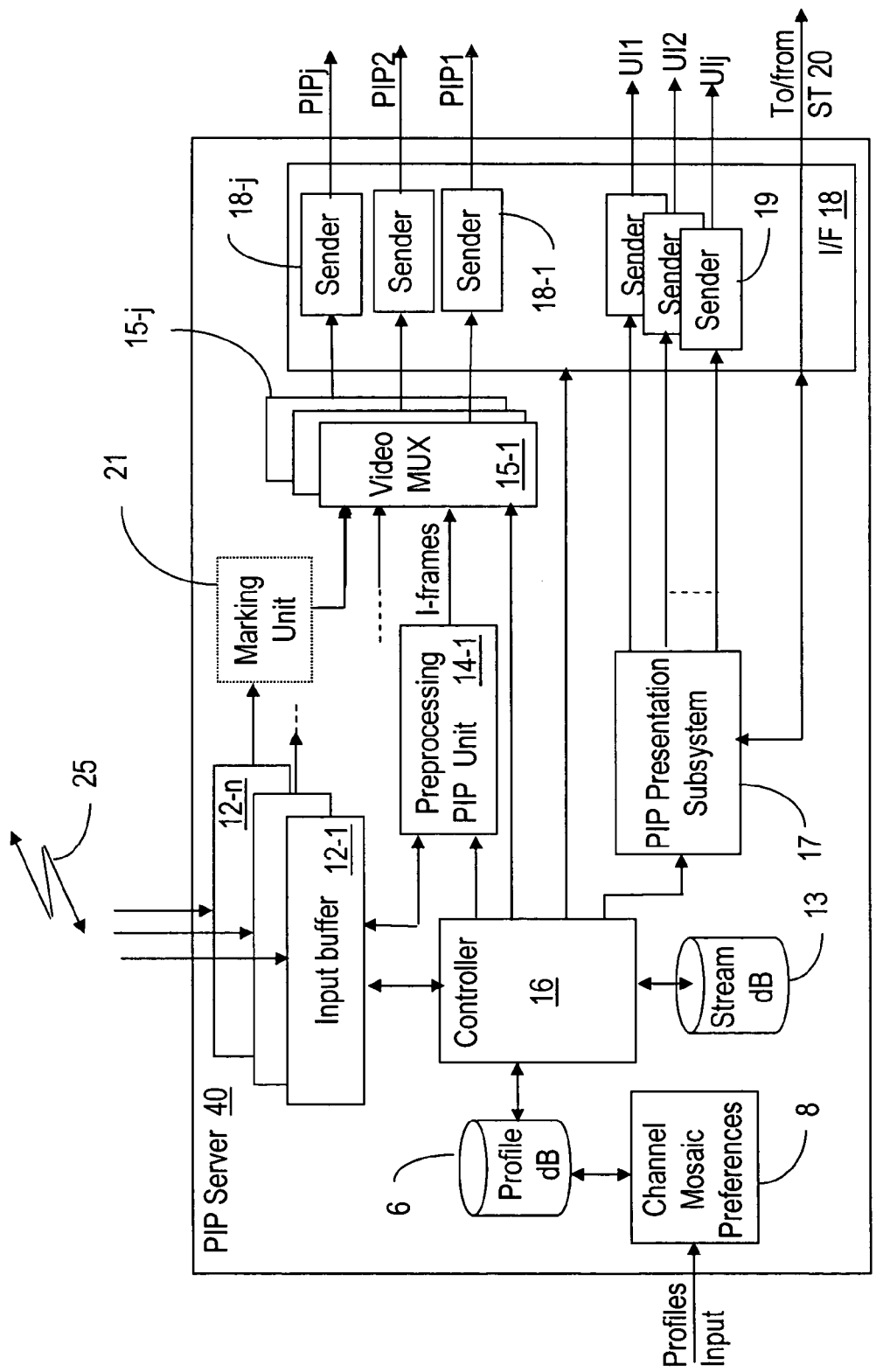
FIG. 3 is a block diagram of still another embodiment of the PIP system of the invention.

In the embodiment of FIG. 3, PIP server 40 transmits a plurality of PIP mosaic streams using a plurality of video multiplexers 15-1 to 15-j. The multiplexers generate the respective preview mosaic (or composite preview signal) for transmission over network interface 18. In this embodiment, interface 18 comprises a like plurality of senders 18-1 to 18-j that broadcast PIP mosaic streams denoted with PIP1 to PIPj. Each stream PIP1 to PIPj has a different PIP mosaic, according to the user profiles and also based on the channel grouping offered by the respective content provider.

Each input buffer 12-1 to 12n is associated with a respective preprocessing unit 14-1 to 14-m, which accesses the corresponding input buffer and selects only the I-Frames from the complete information carried by the respective elementary stream. A plurality of individual preview signals, each containing a reduced number of frames (I-frames) capable of rendering a respective thumbnail picture, are available at the output of the respective preprocessing units 14-1 to 14-m. Under control of unit 16, each video multiplexer 15-1 to 15-j combines certain individual preview signals according to the respective profile data pre-stored in database 6. Each composite preview signal is then streamed by a respective sender 18-1 to 18-j (also called the PIP sender) to the subscriber terminal served by PIP server 40.

In the embodiment shown in FIG. 3, the UI information for all mosaic overlays is provided to a respective sender 19-1 to 19j (hereinafter also referred as the UI sender) which then broadcasts the presentation information to the user terminal over network 5, under control of unit 16. The subscriber terminal 20A combines the PIP data with the presentation data to provide a PIP image on the display 20B (see FIG. 1). In this case, a subscriber terminal can join any number of combined video streams just like it would join any regular video stream, without the need for a transaction to be completed with server 40.

In either embodiment, preprocessing units 14 may use an I-Frame translation mechanism 9, as shown in FIG. 2 for the I-Frames extracted from input buffer 12-n. The translation mechanism 9 may be added as a precursor to the multiplexer 15, for translating the I-frames in real-time into a form requiring even less bandwidth, for display in smaller PIP.

In the example of an MPEG stream, discontinuity markers and/or NULL packets could be inserted for clients that don't purely support the playback of I-Frames, as shown at 21 on FIG. 3. Discontinuity markers are used to indicate to the codec software in the terminal 20A that the packets arriving in the stream are not necessarily following the normal clock synchronization. They tell the player that the clock synchronization automatically established with the clock references in the stream needs to be reset and re-established. This ensures that the player does not become confused by the gaps in the stream caused by the elimination of non-essential packets.

It is evident that the embodiments of the invention provide support for multiple previewed channels without the need to increase bandwidth allocations in a linear fashion; traditional PIP systems would need two or more times the necessary bandwidth for this. The invention is codec-agnostic (support for MPEG1, MPEG2, H.264 AVC, etc.) and could be applied to various technologies.

To render the server and client PIP system interactive, the end user is able to highlight the different thumbnail image panels and to activate the highlighted selection. Activation of a panel causes the end user device to change channels to the channel featured by the highlighted image. This is enabled by the use of the UI (presentation) data, and more specifically the tag overlaid on each of the panels in the PIP. As indicated above, since subsystem 17 is aware of which channel is in which panel, each thumbnail image also displays a respective tag. When a thumbnail image is activated, the end user device consults the tag of the highlighted thumbnail; since the tag contains the channel presented in the highlighted thumbnail image, activation of the panel causes the switching of channels to that presented by the panel.

Typically, STBs and other consumer digital video devices such as personal video recorders (PVRs) accomplish real-time decoding of data streams by employing dedicated hardware (e.g., a dedicated MPEG decoder chip or specialty decoding processor) for decoding. However, in the case of this invention, since the preview streams are of low bandwidth and complexity, they do not require a dedicated hardware processing engine at the ST 20 to decode them, the decoding can be done in software through a general processing unit as shown in FIG. 4.

Figure 4:
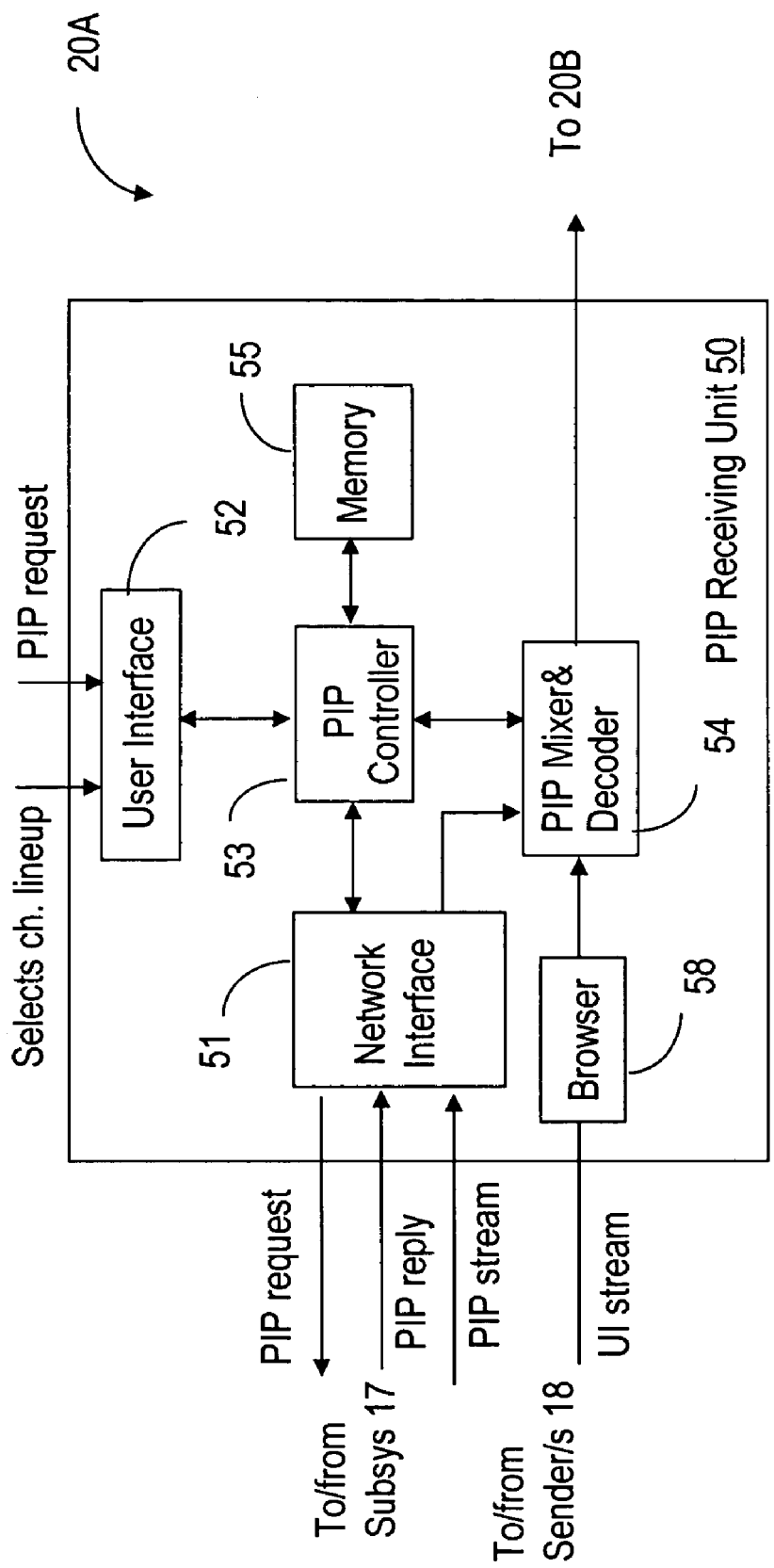
FIG. 4 shows a block diagram of the PIP receiving unit at the subscriber terminal.

FIG. 4 shows a block diagram of the PIP receiving unit 50 provided at the subscriber terminal 20A; this block diagram shows only the units relevant to the invention. As indicated above, the receiving unit 50 comprises a browser 58 for receiving the UI stream from the respective PIP server upon request from the subscriber through a separate interaction. The PIP receiving unit 50 is also provided with a PIP controller 53, a PIP mixer and decoder 54 and a memory 55. A network interface 51 sends PIP requests for a PIP individual preview or a mosaic preview to the PIP server 10, 30 or 50. A user interface 52 enables the user to communicate with the PIP controller using e.g. a remote.

The requests for a preview mosaic or panel is transmitted to the PIP server over interface 51 are formatted for compliance with the protocol supported by network 5, and the replies are formatted into data compliant with the language used by the PIP controller 53. To this end, interface 51 may be equipped with a dedicated sender, or may use a sender already provided for general interaction with the broadcast delivery system 100. Depending on the operations available at the PIP server 10, 30 or 50, the request indicates the channel/s of interest, or may just indicate that the subscriber wishes to join the PIP mosaic stream. The network interface 51 also processes the PIP server replies and provides the stream address to the PIP controller, for enabling the decoder to join the respective streams.

PIP mixer and decoder 54 joins the PIP and UI streams based on the address of the streams provided by the controller 53. The decoder is tuned on the secondary channel for receiving the reduced bandwidth stream/s with the I-Frames for the channel/s requested for preview, formats the PIP signals as/if needed, and decodes the data in the stream/s for enabling display on monitor 20B. The decoder also overlays the UI signal over the PIP signal when needed, for enabling the viewer to associate the thumbnail images with the channels.

PIP mixer and decoder 54 may perform I-Frame reverse translation, if translation has been performed by the PIP server, for rebuilding the further compressed signal. When the ST 20 does not support the playback of I-Frames, the stream contains markers, as discussed earlier. In this case, decoder 54 uses the markers for clock synchronization.

PIP controller 53 controls information transfer to and from network interface 51 and user interface 52, and controls operation of PIP mixer and decoder 54.

The remote (not shown) is provided with an additional control that enables the subscriber to request a PIP image. Still another control may be used for enabling the subscriber to specify the channels in the preview mosaic, if PIP server supports this option (e.g. servers 10, 40). When various preview mosaics are available, PIP receiving unit 50 may keep these variants locally in memory 55, ready for selection at a press of a button. It is to be noted that if the subscriber terminal is a computer, a remote is not necessary, and the controls are activated as well known on a GUI. Other ways to enable a subscriber to interact with server 10, 30 or 50 are equally possible. Such means include the ones known today, or may be devised in the future; they are not relevant to the resent invention.

By way of example, a remote may be provided with a dedicated PIP control button that presents to the user upon activation a PIP Menu, with all available channel, or groupings of channels. The subscriber then selects the channel or grouping of interest, and the PIP preview channel is overlaid on the channel currently displayed. ST 20A may also be provided with means for setting preferences as to where the respective thumbnail picture appears on the screen, and the size of the thumbnail picture. This is particularly relevant if only one channel is selected for the PIP image.

We claim:

1. A method for producing thumbnail images of video content in a video stream carrying frames of compressed video data, comprising:
   storing, in an input buffer, a preset amount of the video data from said video stream;
   selecting from, said input buffer, a plurality of frames, each of the plurality of frames resulting in a significant change in the video data from an immediately previous frame;
   generating a preview signal, the preview signal consisting of the plurality of frames resulting in a significant change;
   converting said preview signal into a picture-in-picture (PIP) stream and broadcasting said PIP stream to subscriber terminals (ST) over an access network according to a transmission protocol recognized by said network; and
   at a ST, joining a PIP stream of interest for playback of a thumbnail moving image with the video content in said video stream, overlaid on a full size image of the video content in any video stream that is currently played-back on said ST,
   wherein said PIP stream uses a portion of network bandwidth otherwise needed if all frames of said video streams were broadcast over said access network.

2. A method as claimed in claim 1, wherein said video stream is an elementary video stream broadcast from an interactive broadcast delivery system in a MPEG2 transport stream, and said frames identified by a significant change in the video data are I-Frames.

3. A method as claimed in claim 1, wherein said PIP stream is broadcast in a vestigial sideband frequency modulation format, carried on a secondary channel.

4. A method as claimed in claim 1, further comprising:
   providing a user interface (UI) for said thumbnail moving image for enabling selection of said corresponding video stream at said ST.

5. A method as claimed in claim 4, wherein said step of providing a user interface comprises:
   processing stream data pertinent to said video stream for generating a UI signal associated with said preview signal;
   encoding said UI signal into an UI stream according to a transmission protocol recognized by said network; and
   broadcasting said UI stream over said network.

6. A method as claimed in claim 5, wherein said UI is a Hypertext Markup Language (HTML) frame which presents channel identification information to the respective thumbnail image.

7. A method as claimed in claim 5, wherein said stream data includes channel and program identification data pertinent to said preview signal.

8. A method as claimed in claim 5, further comprising including in said UI signal presentation data for presenting said thumbnail image with at least one of a background and frame of choice.

9. A server for producing thumbnail images of video content in video streams carrying frames of compressed video data, comprising:
   n input buffers, each for storing a preset amount of the video data from a respective video stream, under control of a controller;
   m preprocessing units, each associated with an input buffer, wherein each of the preprocessing units is configured to:
      from said associated input buffer a plurality of frames, each of the plurality of frames resulting in a significant change in the video data from an immediately previous frame, and
      generate a preview signal, the preview signal consisting of the plurality of frames resulting in a significant change, where m and n are integers and $m \leq n$;
   a network interface for converting each said preview signal into a picture-in-picture (PIP) stream and broadcasting said PIP streams to subscriber terminals (ST) over an access network,
   wherein each PIP stream uses a portion of bandwidth otherwise needed if all frames of said video stream were broadcast to said ST.

10. A server as claimed in claim 9, wherein said video stream is an elementary video stream broadcast from an interactive broadcast delivery system over a MPEG2 transport stream.

11. A server as claimed in claim 10, wherein said frames resulting in a significant change in the video data are I-Frames.

12. A server as claimed in claim 9, wherein said network interface comprises m PIP senders for encoding said preview signals into said PIP streams according to a transmission protocol recognized by said network.

13. A server as claimed in claim 9, further comprising a PIP presentation subsystem for receiving, from said controller, stream data pertinent to each said video stream and providing a user interface (UI) signal for each preview signal.

14. A server as claimed in claim 13, wherein said network interface further comprises a UI sender for encoding said UI signal into a UI stream according to a transmission protocol recognized by said network and broadcasting said UI streams over said network.

15. A server as claimed in claim 13, wherein said UI is a Hypertext Markup Language (HTML) frame which presents channel identification information to the respective thumbnail video image for enabling selection of said corresponding video stream at said ST.

16. A server as claimed in claim 13, wherein said UI signal comprises additional presentation data for said corresponding thumbnail image.

17. A server as claimed in claim 13, further comprising a database for maintaining said stream data for all video streams processed by said server.

18. A server as claimed in claim 9, further comprising a video multiplexer for multiplexing said preview signals into a composite preview signal.

19. A server as claimed in claim 18, wherein said network interface converts said preview signal into a PIP mosaic stream, and broadcasts said PIP mosaic stream to said STs for enabling said STs to join said PIP mosaic stream for playback of a preview mosaic of thumbnail moving images of the video content.

20. A server as claimed in claim 18, further comprising a PIP presentation subsystem for receiving, from said controller, stream data pertinent to each said video stream and providing a user interface (UI) signal for said preview signal.

21. A server as claimed in claim 9, further comprising a translation unit for further reducing the number of video frames in each said preview signal.

22. A server as claimed in claim 9, further comprising j video multiplexers, each for multiplexing a set of said preview signals into a distinct composite preview signal.

23. A server as claimed in claim 22, wherein said network interface converts each said distinct composite preview signal into a respective PIP mosaic stream, and broadcasts said PIP mosaic stream to said ST, for enabling said STs to join any of said distinct PIP mosaic stream for playback of a corresponding preview mosaic of thumbnail moving images of the video content.

24. A picture-in-picture (PIP) receiving unit for enabling a subscriber terminal (ST) to join a PIP stream for playback of a thumbnail moving image of video content in a corresponding video stream, overlaid on a full size image of the video content in any video stream that is currently played-back on said ST, comprising:
  a network interface for interaction with a PIP server over an access network for requesting, receiving, and demodulating a reduced bandwidth PIP stream into a preview signal,
  the preview signal consisting of a plurality of frames of video data selected from a video stream carrying frames of compressed video data, wherein each of the plurality of frames included in the preview signal results in a significant change in the video data from an immediately previous frame;
  a user interface for enabling a user of said ST to request said PIP stream from said PIP server; and
  a PIP decoder for converting said preview signal into a video signal for enabling playback of a thumbnail moving image of the video content in said video stream at said ST.

* * * * *

UNITED STATES PATENT AND TRADEMARK OFFICE
CERTIFICATE OF CORRECTION

PATENT NO.       : 7,644,425 B2                                                Page 1 of 1
APPLICATION NO.  : 11/385735
DATED            : January 5, 2010
INVENTOR(S)      : Alistair John Parker et al.

It is certified that error appears in the above-identified patent and that said Letters Patent is hereby corrected as shown below:

Col. 10, claim 9, line 10, please insert the word --extract-- before "from";

Col. 10, claim 9, line 16, the symbol lesser than or equal to should appear as "$\leq$" without a double line.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,644,425 B2  Page 1 of 1
APPLICATION NO. : 11/385735
DATED : January 5, 2010
INVENTOR(S) : Parker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 912 days.

Signed and Sealed this

Twenty-first Day of December, 2010

David J. Kappos
*Director of the United States Patent and Trademark Office*